Figure 1:
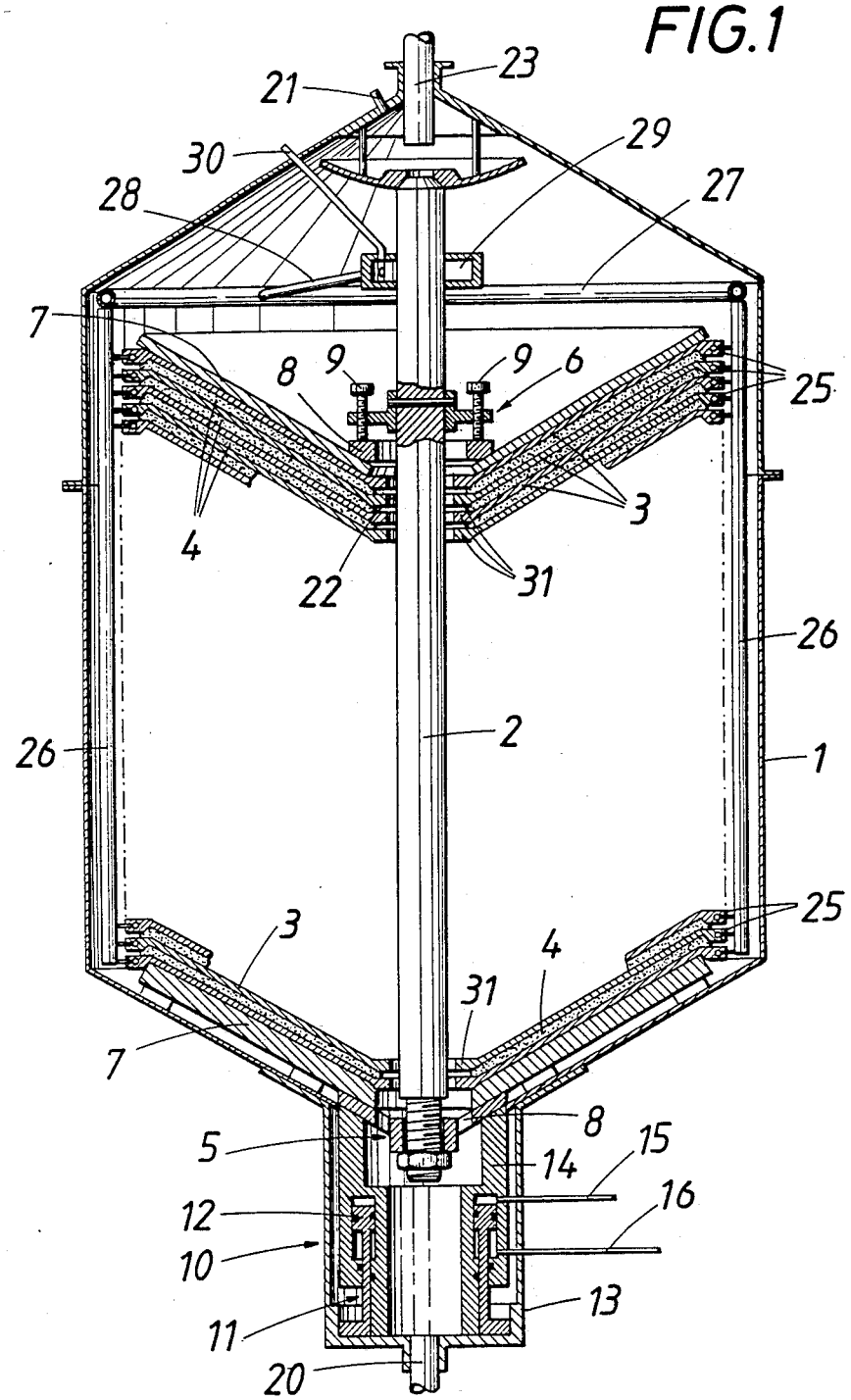

United States Patent [19]

Schafft

[11] Patent Number: 4,655,919
[45] Date of Patent: Apr. 7, 1987

[54] FLUID FILTER DEVICE

[76] Inventor: Helmut Schafft, Kellerweg 23, D-7074 Mögglingen, Fed. Rep. of Germany

[21] Appl. No.: 462,097

[22] Filed: Jan. 28, 1983

[30] Foreign Application Priority Data

Feb. 11, 1982 [AT] Austria .................................. 506/82

[51] Int. Cl.$^4$ ............................................. B01D 25/02
[52] U.S. Cl. .................................. 210/236; 210/275; 210/282; 210/283; 210/284; 210/492; 210/497.3
[58] Field of Search ............... 210/269, 288, 282, 281, 210/284, 263, 264, 266, 230, 275, 283, 285, 232, 345, 347, 356, 352, 497.3, 236, 521, 336, 492; 55/386

[56] References Cited

U.S. PATENT DOCUMENTS

| | | | |
|---|---|---|---|
| 884,765 | 4/1908 | Schlemmer | 210/350 |
| 2,750,045 | 1/1953 | Hoffmann et al. | 210/497.3 |
| 3,731,466 | 5/1973 | Kunsman | 55/386 |
| 4,062,777 | 12/1977 | Tsuruta et al. | 210/264 |
| 4,292,178 | 9/1981 | Mori et al. | 210/352 |

FOREIGN PATENT DOCUMENTS

| | | | |
|---|---|---|---|
| 621559 | 12/1962 | Belgium | 210/340 |
| 192887 | 5/1906 | Fed. Rep. of Germany | 210/284 |
| 755265 | 4/1933 | France | 210/289 |

*Primary Examiner*—David L. Lacey
*Attorney, Agent, or Firm*—Kurt Kelman

[57] ABSTRACT

The filter comprises a pressure vessel, which contains vertically spaced apart partitions for supporting respective layers of a particulate filtering material. In order to ensure that the result of the filtration will not be influenced by fluctuations of the flow, pressure and temperature conditions of the solids-laden fluid to be filtered, each layer of filtering material is enclosed by a sheath, which is permeable to the fluid to be filtered and impermeable to the filtering material and which together with said filtering material constitutes a filtering package, which is engaged at its top and bottom by two of said partitions and is compressed by said partitions under constant pressure. The partitions engaging each of said filtering packages at its top and bottom define with said filtering package passages for the supply of said solids-laden fluid to said filtering package and for withdrawing filtrate from said package.

10 Claims, 5 Drawing Figures

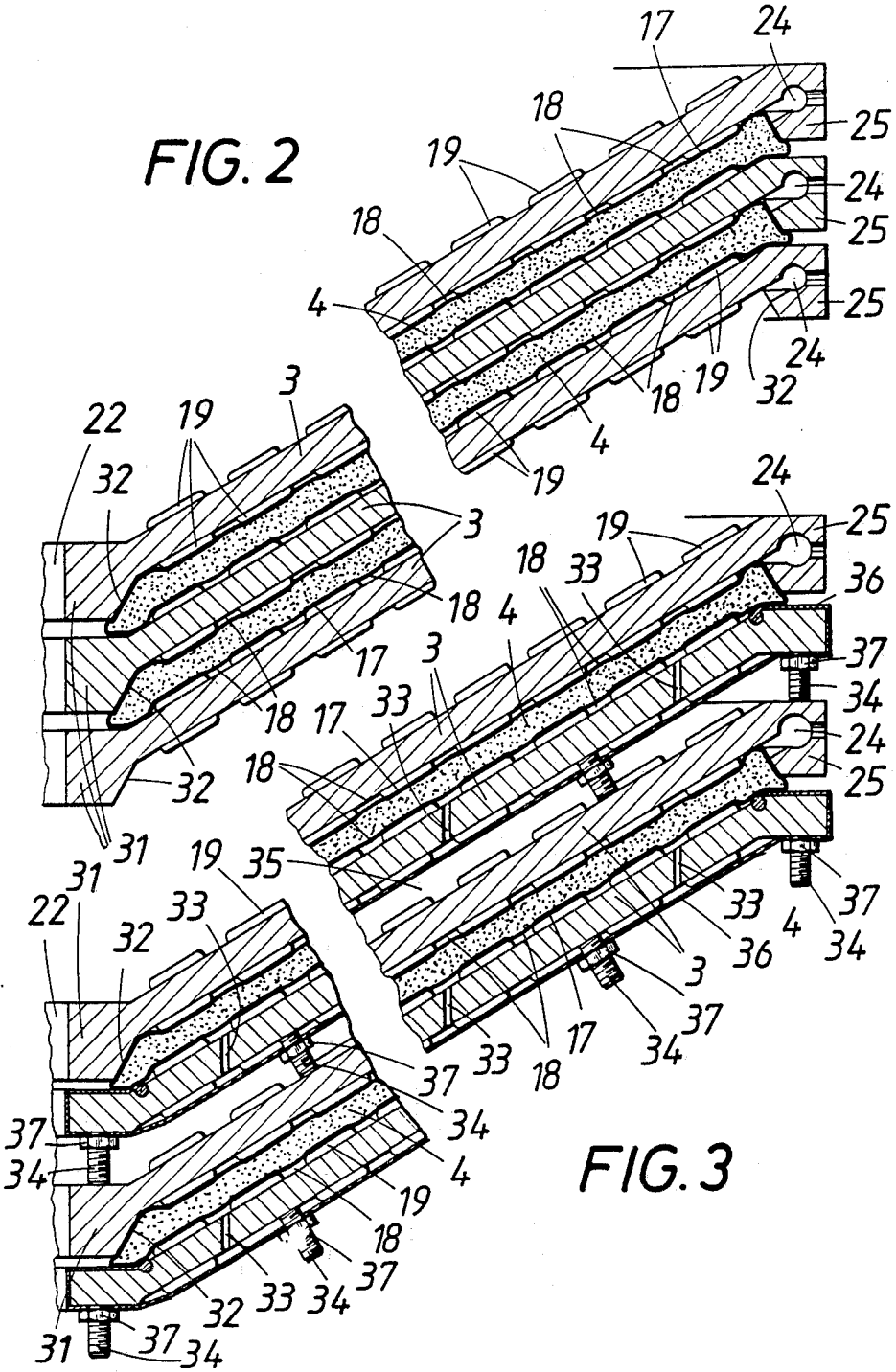

FLUID FILTER DEVICE

BACKGROUND OF THE INVENTION

This invention relates to a filter, particularly for beverages, comprising a pressure vessel containing vertically spaced apart partitions for supporting respective layers of a substantially particulate filtering material.

In known filters of that kind, the filtering powder material, which usually consists of diatomaceous earth, is permitted to settle out of a suspension on the several partitions so as to form a filter bed. A pure liquid, such as water, is used as a fluid in which the filtering material is suspended. At the beginning of the filtration, that liquid must be displaced by the slurry which is to be filtered. As the pressure vessel is filled with a liquid in which the filtering material is suspended, the pressure vessel is perfectly degassed by the rising liquid. But as said liquid is displaced by the slurry to be filtered, the latter is mixed with the suspending liquid and this mixing may result in a loss of filtrate. Similar disadvantages are encoutered when the filtration has been terminated because the liquid which is required to displace the slurry from the filter bed is also mixed with the slurry or the filtrate. Besides, solids which have been retained by the filter bed may be detached therefrom.

As the filtration depends on the condition of the filter bed, fresh filtering material must be continually supplied during the filtration so that the surface of the filter bed is continually re-formed and the filter bed is maintained in a permeable condition. As the condition of such a filter bed may also be influenced by fluctuations of the flow, pressure and temperature conditions of the fluid to be filtered, it is difficult to achieve constant results by the filtration.

It is an object of the invention to avoid these disadvantages and so to improve a filter of the kind described first hereinbefore that the supply of the filtering material, in the form of a suspension, and the disadvantages involved in the supply in that form, can be eliminated and that it is ensured that the result of the filtration will not be influenced by fluctuations of the flow, pressure and temperature conditions of the fluid which is to be filtered.

This object is accomplished according to the invention by enclosing each layer of filtering material by a sheath, which is permeable to the fluid to be filtered and impermeable to the filtering material whereby a filtering package is obtained, which is engaged at its top and bottom by respective partitions and is compressed by the partitions under an at least approximately constant pressure, and passages are defined between each filtering package and the two partitions engaging the package and serve to supply the fluid to be filtered to the package and to withdraw filtrate from the package.

The sheath may consist of any known filter cloths, provided that it is permeable to the fluid to be filtered and impermeable to the filtering material contained in the package.

The pressure under which each filtering package is compressed should be sufficient to prevent a channeling in the filtering material package in response to changes of the flow rate and pressure of the fluid which is to be filtered.

Because the layer of filtering material which is enclosed by a sheath that is impermeable to the filtering material constitutes a filtering package which is compressed between the partitions engaging the filtering package at its top and bottom, the particulate filtering material will be held together under all operating conditions so that the effect of a sintered body of filtering material is obtained in spite of the fact that the filtering material is particulate. On the other hand, the disadvantages involved in the use of a sintered body of filtering material are avoided, such body being able to be regenerated only to a restricted degree because the solids of the slurry which is to be filtered wil enter the pores of the sintered body and will be so firmly retained in the pores that they cannot be removed even by very intense backwashing. Because in accordance with the invention the particulate filtering material is enclosed by a sheath, relatively large solids cannot pass through the sheath and enter the filtering material. The filtering material has such a surface texture that any solids which have reached the filtering material cannot be anchored in the latter so that all solids will be removed from the filtering material when the latter is backwashed and such backwashing will result in a perfect purification and regeneration of the filtering package. Where the solids consist of organic substances, such purification and regeneration can be ensured by a backwashing with an alkaline solution.

The filtering properties of each layer of filtering material layer will depend on the geometry of the layer and will be independent of the operating conditions because the layer will be held together under the pressure applied to the filter package. For this reason, uniform results of the filtration will be ensured. It will be understood that the use of filtering packages comprising a particulate filtering material the particles of which are immovably held under an at least approximately constant pressure which is applied will eliminate the need for supplying the filtering material in the form of a suspension in a liquid. For this reason the pressure vessel which contains the filter packages between the partitions can be degassed as a slurry to be filtered is supplied to each filtering package in the passages between the package and the partitions and flows through the filtering package and a filtrate is drained from the filtering package on the other side thereof. Because the filtering packages are vertically superimposed, the gas contained in the pressure vessel is entirely displaced by this operation. As a result, there will be no undesired draining of a mixture of filtrate and of liquid in which a filtering material was suspended and the disadvantages involved in the draining of such mixture will be avoided.

According to a further feature of the invention, a filter having a particularly simple structure will be obtained if a partition which is impermeable to filtrate is provided between, the engaged by, adjacent filter packages. A very compact filter can be obtained in this manner although it is recommended to subject the slurry to a preliminary coarse filtration in order to avoid a retention of coarse solids by the filter packages, which are particularly suitable for a fine filtration.

If the partition engaging a filtering package at its bottom consists of a sieve and is supported by pressure-resisting means on the filtrate-impermeable partition engaging the top of the next lower filtering package and a plenum chamber for solids-laden fluid is defined between the sieve and filtrate-impermeable partition, it will be possible to use the filter for a filtration in two stages, namely, a coarse filtration and a fine filtration. In such a filter the sieve will retain coarse particles, which will remain in the plenum chamber between the sieve and the next lower partition which is impermeable to filtrate, so that said coarse particles can easily be entrained out of the plenum chamber by backwashing. It is important that the sieve is supported by pressure-resistant means on the partition which engages the next lower filtering package at its top so that the required pressure can be applied to each filtering package by the associated partitions.

If the sieve consists of a perforated plate, coarse solid particles which are to be retained may be seized in the holes of the sieve and it may not be possible to remove such particles by backwashing. To ensure that the sieves will not be clogged, the undersurface of each sieve may be covered by a filter cloth, which will prevent an ingress of coarse solid particles into the holes of the sieve.

The partitions are usually mounted on a rod which is centered on the vertical central axis of the pressure vessel. When this known design is adopted, the required pressure can be applied to the filtering packages in a particularly simple manner if the partitions are axially slidably mounted on the central rod and are gripped between two pressure-applying heads, one of which is axially immovably fixed to the rod whereas the other pressure-applying head is slidably mounted on the rod and is connected to an actuator, by which an adjustable, desired pressure can be applied via the pressure heads and the partitions to the filtering packages whereas the rod acts as a tie rod.

In order to prevent a shifting of solid particles in a given filtering package and resulting changes of the geometric configuration of such package, particularly a channeling in the filtering material, the pressure applied to the packages should be at least approximately constant regardless of any changes of the temperature and pressure of the solids-laden fluid to be filtered. If the pressure applied is high in relation to the changes of the pressure of the solids-laden fluid, which changes may be due to temperature fluctuations, then it will be sufficient to apply a constant pressure to each filtering package by means of the partitions. But if the influence of the changes of the pressure of the solids-laden fluid is not negligible, then any fluctuation of the pressure of said fluid in the pressure vessel will have to be compensated by a change of the pressure applied to the filtering packages by the partitions. This can be accomplished in a very simple manner if the pressure-applying means consists of a fluid-operable cylinder, to which a predetermined fluid pressure is applied. In that case, a constant pressure will be applied to the filtering packages regardless of any fluctuations of the pressure of the solids-laden fluid and a shifting of particles in any filtering package will be prevented.

Instead of a fluid-operable cylinder, a pressure applying spring may be used as an actuator because the displacement remains negligibly small.

Particularly desirable conditions for the degassing of the pressure vessel or for the complete draining of a liquid from the pressure vessel will be obtained if, according to a further feature of the invention, the partitions and the filtering packages have the configuration of inverted hollow cones, which are open-topped. The gas contained in the pressure vessel will then be displaced upwardly by the slurry which is to be filtered owing to the buoyancy of such gas whereas no gas to be displaced can accumulate in dead spaces. On the other hand, when air is admitted to the pressure vessel, all liquid can be drained from the filter packages. If the hollow cones have included angles between 90 and 150 degrees, the distribution of the slurry over each filtering package and the flow conditions will be satisfactory.

It will be understood that the filtrate must be removed from each filtering package adjacent to the top rim of each open-topped inverted hollow cone if the degassing of the pressure vessel is to be assisted by the supply of the slurry into the vessel. A simple structure will be obtained if the passages defined between each filtering package and the partition engaging the top of the filtering package communicate with an annular manifold surrounding the outer rim of the partition. To ensure a uniform distribution of the filtrate to be drained over the surface of each filtering package, the annular manifold may be connected to a plurality of axially extending withdrawing pipes which are regularly spaced around the periphery of the vessel near the inside peripheral surface thereof.

If the passages left between each filtering package and the partition engaging the package at its bottom communicate with at least one supply passage extending through the apex portions of the inverted hollow cones, the liquid which has been supplied can be dreained entirely through such supply passage during backwashing. It will be understood that the slurry can be supplied to a filtering package through the passages between the filtering package and the partition which engages the bottom of the package and may be supplied to the passages adjacent to the outer rim of the partition so that an improved distribution of the flowing fluid over the filtering package will be ensured.

The passages between the filtering packages and the partitions must ensure a satisfactory supply of the solids-laden fluid to all parts of the filtering package and a satisfactory withdrawal of filtrate from all parts of the filtering package. These requirements can be met in a convenient manner by defining the passages between each filter package and the adjacent partitions by ribs provided on those surfaces of the partitions which engage said package to define an array of passages on the entire surface of the filtering package so that the passages are open to the filtering package on a large area.

Because the filtering material of each filtering package is particulate and consists, e.g., of a powder, the package is easily deformable and the filtering material must be deformed to the proper shape before it is placed into the pressure vessel. This can be accomplished by mixing the filtering material with a soluble, preferably water-soluble binder, deforming the resulting mixture to form a body having a desired shape and then enclosing this body by the sheath. Such a shaped body can be handled in a convenient manner and can be properly fitted between two conforming partitions in the pressure vessel. When the filtering package has been subjected to the pressure required to hold the package in position, the binder must be dissolved out of the filtering material. This can easily be effected by washing the filtering packages with a suitable solvent.

Alternatively, filtering packages having a proper shape can be obtained by stretching the filtering package consisting of the filter material and the enclosing sheath on a dimensionally stable shaping cone so that the filtering package will be held in the shape which is determined by the shaping cone. When the filtering package stretched on the shaping cone has been placed into the pressure vessel, the shaping cone must be removed from the top of the package and must be replaced by the partition having a similar shape. To that end, the filtering package supported by the next lower partition, which has previously been installed in the pressure vessel, must be relieved from the forces retaining the package on the shaping cone. This can be accomplished if the shaping cone is hollow and can be torn open at least approximately along a generatrix of its conical surface. As the conical surface of the hollow shaping cone is torn open, the diameter of the shaping cone can be decreased and the shaping cone can be pulled from the filtering package without an exertion of forces on the package.

The invention is diagrammatically illustrated in the drawing, in which

Figure 4:
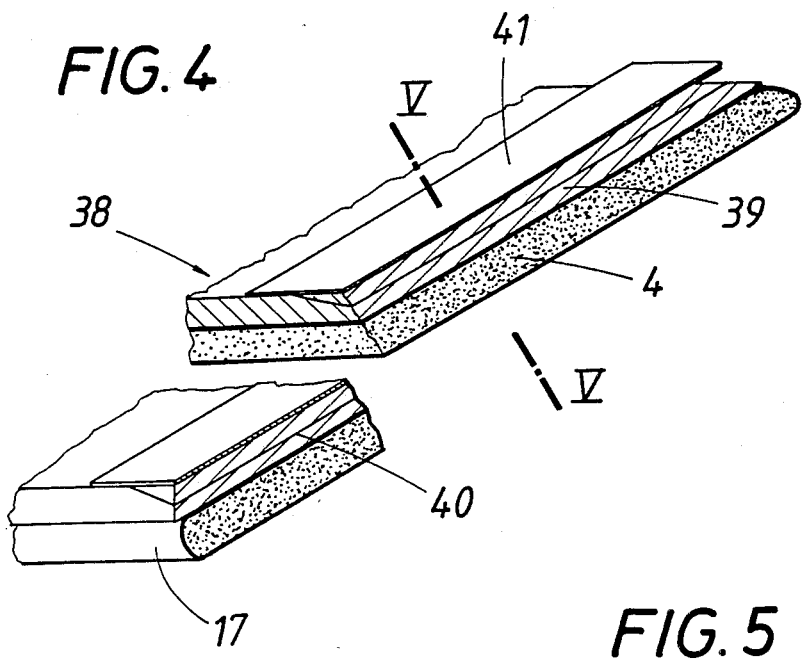
Figure 5:
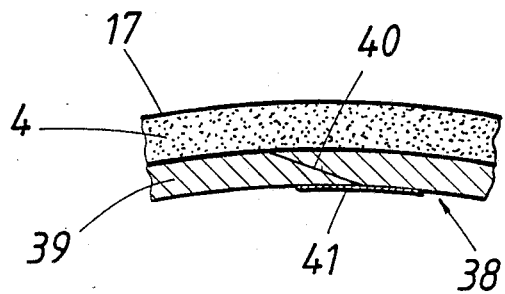

FIG. 1 is a simplified vertical sectional view showing a filter embodying the invention, FIG. 2 is an enlarged transverse sectional fragmentary view showing filter packages of the filter, FIG. 3 is a view similar to FIG. 2 and illustrates modified filtering packages, FIG. 4 is a sectional view showing a filtering package carried by a shaping cone and FIG. 5 is a sectional view taken on line V—V in FIG. 4.

The filter shown in FIG. 1 comprises a pressure vessel 1, which contains a centrally disposed, vertical rod 2, which is surrounded by filter packages 4 held between partitions 3, which are mounted on the rod 2. Two pressure-applying heads 5 and 6 are also mounted on the rod 2 and are operable to apply pressure to the filter packages 4 via the partitions 3. Each of the pressure-applying heads 5 and 6 comprises a hollow-conical jaw 7 and an actuating member 8, which is mounted on the rod 2 and adapted to support the associated jaw 7. The actuating member 8 of the pressure-applying head 5 is slidably mounted on the rod 2 between stops. The actuating member 8 of the pressure-applying head 6 is supported on the rod 2 by means of adjusting screws 9, which can be operated to apply an initial compressive stress to the filtering packages 4 disposed between the partitions 3 when the pressure-applying head 5 is in its lowermost position defined by a stop.

As a shifting of particles of the filtering material in each filtering package 4 is to be avoided, the particles must be held together by forces applied from the outside and changes of the conditions of the fluids flowing through the filtering packages must not result in pressure gradients by which such particles would be shifted. For this reason, any appreciable change of fluid pressure must be compensated by a corresponding change of the pressure applied to the filter packages via the partitions. For this purpose, the pressure-applying head 5 is connected to an actuator 10, which consists of a fluid-operable cylinder 11 that contains an annular piston 12. The arrangement is such that the annular piston 12 is firmly supported in a housing 13, which is flange-connected to the pressure vessel 1, and in response to a supply of fluid under pressure through the fluid conduit 15 to the cylinder 11 the cylinder body 14 is forced against the pressure-applying head 5, which is slidable on the rod 2 and the lowermost position of which is defined by a stop. The fluid-operable cylinder 11 can be actuated in the opposite direction by a supply of fluid under pressure through the fluid conduit 16, which just as the fluid conduit 15 can be connected to a source of fluid under pressure and a fluid reservoir in alternation. After such actuation of the cylinder 11 by fluid under pressure supplied through the fluid conduit 16, a minimum compressive stress between the pressure-applying heads 5 and 6 will be maintained because in that case the pressure-applying head 5 is in its lowermost position, which is defined by the stop.

As is apparent from FIG. 2, each partition 3 consists of an inverted hollow cone, which is open at its top. The top and bottom partitions 3 are in snug contact with top and bottom jaws 7, respectively. Each intermediate partition 3 is engaged at its top and bottom with upper and lower filtering packages 4 so that each filtering package 4 is engaged at its top and bottom by partitions 3 and is compressed by the partitions under an approximately constant pressure in the manner described hereinbefore. Each filtering package 4 consists of a particulate filtering material, such as diatameceous earth, and a sheath 17, which encloses the filtering material and is permeable to the solids-laden fluid which is to be filtered and impermeable to the filtering material. As the slurry to be filtered must flow through the filtering packages 4, passages 18 are required between the partitions 3, which are impermeable to the filtrate, and the filter packages 4. These passages serve to supply solids-laden fluid to the filtering package and to withdraw the filtrate from the package. The passages 18 are defined by ribs 19, which protrude from the partitions 3 and which define an array of passages which ensure a satisfactory distribution of the slurry over the surface of the filtering package and an undisturbed withdrawal of the filtrate from all parts of the surface of the filtering package.

At the beginning of a filtration, the slurry to be filtered is supplied to the pressure vessel 1 from below through a conduit 20, which extends through the cylinder 11. This will result in a degassing of the pressure vessel 1 through a venting valve 21 provided at the top of the vessel 1. Because an annular supply passage 22 is defined by the rod 2 and apertures formed in the apex portions of the partitions 3, the slurry can flow to each filter package from the apex of the hollow cones formed by the filter package 4 and the partition 3 which engages the filter package at its bottom so that, during the degassing of the pressure vessel at the beginning of a filtration, the gas contained in the filter packages, such as air or $CO_2$, is displaced upwardly and leaves the pressure vessel through the conduits for draining the filtrate. When the pressure vessel has been filled with the slurry, additional slurry is supplied to pressure vessel at its top through a supply conduit 23 and flows through the filter packages 4 and is subsequently collected in annular manifolds 24, each of which surrounds an associated partition 3 near its outer rim 25. These manifolds 24 are connected to axially extending withdrawing pipes 26, which are uniformly distributed around the partitions 3 near the inside peripheral surface of the pressure vessel 1 so that the flow is properly distributed over the filter packages. The withdrawing pipes 26 are connected to a common top manifold 27, which is connected by a rising pipe 28 to a chamber 29 for collecting the filtrate. From chamber 29, the filtrate is withdrawn from the vessel through a rising pipe 30. Because all passages are ascending, there are no dead spaces in which upwardly displaced gas could accumulate.

Through the same passages, all liquid can be removed from the pressure vessel 1 because all passages descend in the opposite direction of flow. If gas is admitted to the pressure vessel 1, all liquid can be removed from the pressure vessel through the conduit 20 which extends from the bottom portion of the pressure vessel 1 through the annular cylinder 11.

For a satisfactory operation of the filter which is shown, it is essential that an adequate, at least approximately constant pressure is applied to the filter packages 4 by the partitions 3 so that any shifting of filtering material in the filtering packages and any channeling in the filtering material will be reliably prevented. For this purpose, the partitions must be capable of transmitting to the filter packages the pressure forces which are exerted by the jaws 7. Obviously this requires that the partitions 3 which engage the top and bottom of a given filtering package do not support each other in known manner so that liquid-tight plenum chambers for the solids-laden fluid are defined between the partitions. For this reason the partitions 3 are axially spaced apart. In order to ensure in such an arrangement that no filtering package 4 will be short-circuited by a communication between passages 18 for supplying solids-laden fluid and passages 18 for draining filtrate, each partition 3 is formed at its outer rim 25 and its inner rim 31 with respective shoulders 32, which are forced against the associated filtering package by the pressure applied so that fluid flow between the partition and the filtering package will be prevented adjacent to the shoulders.

In the embodiment shown in FIG. 3, a two-stage filtration can be effected because each filtering package 4 is engaged at the bottom by a partition 3 consisting of a sieve, which has holes 33 for the passage of the filtrate. It will be understood that partitions 3 must be capable of transmitting the required pressures to the filtering packages. For this reason, the sieve must be supported by pressure-resisting means on the filtrate-impermeable partition which engages the next lower filtering package at its top. That support is provided by thrust bolts 34, by which the partitions 3 disposed between adjacent filtering packages 4 are spaced apart so that a plenum chamber 35 for the solids-laden fluid is defined between the partitions. The slurry to be filtered enters said plenum chamber at the inner and outer rims of the partitions and flows through the holes 33 in the sieve to the next upper filtering package 4 and is subjected in the filter package to a fine filtration and is then drained as a filtrate in the manner described with reference to FIG. 2. To ensure that the holes 33 will not be clogged by coarse particles, the undersurface of each partition 3 is covered with a filter cloth 36, which is secured to the partition 3 by means of clamping nuts 37, which are screwed to the thrust bolts 34 and retain the coarse particles of the fluid which is to be filtered so that the filtration is effected in two stages, as is desired.

Because the filtering material is particulate, the filtering packages have no stable three-dimensional shape and must be deformed to the desired shape before they are placed into the pressure vessel. For this purpose, the filtering material may be mixed with a soluble binder and the resulting mixture may be shaped to form a body having the desired shape. That body is then enclosed by the sheath. In that case, the binder must be dissolved out of the filtering packages before the filter is operated. In an alternative method, illustrated in FIGS. 4 and 5, each filtering package 4 is applied to a shaping cone 38, which has the shape that is desired for the filtering package. The forces retaining the filtering package on the outside surface of the shaping cone will ensure that the particles of the filtering package will be held together and that the filtering package will be dimensionally stable. When the filtering package has been placed into the pressure vessel 1, on the underside of the inverted shaping cone 38, the latter must be removed and replaced by a partition 3. For this purpose the shell 39 of the shaping cone 38 is torn open along a generatrix so that the diameter of the shaping cone can be reduced by overlapping the edges of the shell which has been torn open. The shaping cone can then be freely detached from the filtering package. The shaping cone can easily be torn open because its shell 39 has been cut along a generatrix and the joint 40 between the edges of the shell has been covered with an adhesive tape 41, which can be torn off. When the adhesive tape 41 has been torn off, the diameter of the shaping cone can easily be reduced, particularly because the edges of the shell define an oblique joint.

The filter which has been described constitutes a column filter which can be used to advantage for a coarse and fine filtration of liquids and for a removal of germs therefrom but can also be used to filter gases. Particularly desirable conditions will be obtained in the removal of germs from beverages, such as beer, wine, fruit juice, mineral water or potable water. The filtering packages may be re-used when they have been purified and regenerated and may remain in the pressure vessel until they have been entirely exhausted. The special arrangement of the filter ensures that the filtration can be carried out with uniform results even at different velocities of flow and different temperatures of the fluid which is to be filtered so that the filtration can be carried out for very long periods of time until backwashing is required.

What is claimed is:

1. In a filter for filtering a solids-laden fluid, comprising;
    an upright cylindrical pressure vessel,
    a plurality of vertically spaced apart partitions contained in said pressure vessel, and
    a substantially particulate filtering material forming a plurality of layers, each of said layers being disposed between two adjacent ones of said partitions, the improvement comprising;
    each of said layers comprising a pre-shaped filtering package consisting of particles of said filtering material enclosed by a sheath which is impermeable to said filtering material and is permeable to said solids-laden fluid,
    each of said filtering packages being engaged at its top and bottom by two of said partitions, at least one of said partitions being impermeable to filtrate and the two partitions and said filtering package being constructed and arranged so as to define passages for a supply of solids-laden fluid to, and for a draining of filtrate from, said filtering package, and
    pressure-applying means for holding the filter material particles immovably in each of said pre-shaped filtering packages under an at least substantially constant pressure between said partitions engaging said filtering packages at their tops and bottoms.

2. The filter set forth in claim 1, wherein a respective one of said impermeable partitions engages one of said filtering packages at its top and the next upper one of said filtering packages at its bottom.

3. The filter set forth in claim 1, wherein
    two of said partitions are disposed between two adjacent ones of said filtering packages and are spaced apart by pressure-resisting means and define a plenum chamber for the solids-laden fluid between said two partitions, one of said two partitions is filtrate-impermeable and engages a lower one of said two filtering packages at its top, and the other of said two partitions consists of a sieve and engages the upper one of said two filtering packages at its bottom.

4. The filter set forth in claim 1, wherein to said partitions are slidably mounted on a rod extending on the vertical center line of said pressure vessel and said pressure-applying means comprises first and second pressure-applying heads mounted on opposite end portions of said rod, said first pressure-applying head being secured to said rod, said second pressure-applying head being slidably mounted so as to slide along said rod, and actuating means for moving said second pressure-applying head along said rod toward said first pressure-applying head so as to apply said pressure via said partitions to said filtering packages.

5. The filter set forth in claim 1, wherein said partitions and said filter packages are constructed so as to have the shape of inverted hollow cones, which are open-topped.

6. The filter set forth in claim 5, wherein said hollow cones have a shape having an included angle of 90 to 150 degrees.

7. The filter set forth in claim 5, wherein each of said partitions has an apex portion formed with an aperture, said apertures communicate with each other to define a supply manifold adapted to receive the solids-laden fluid, and each of said partition engaging one of said filtering packages at its bottom and being constructed and arranged so as to define with said filtering package passages communicating with said supply manifold and adapted to supply said solids-laden fluid from said supply manifold to said filtering package.

8. The filter set forth in claim 1, wherein each of said partitions engaging one of said filtering packages at its top and being constructed and arranged so at to define with said filtering package passages for withdrawing filtrate from said filtering package and is surrounded at its outer rim by an annular manifold communicating with said passages for withdrawing filtrate.

9. The filter set forth in claim 8, wherein a plurality of withdrawing pipes are disposed in said pressure vessel around said partitions and filtering packages and extend in the longitudinal direction of said pressure vessel and are regularly spaced apart in its peripheral direction and communicate with all said annular manifolds.

10. The filter set forth in claim 1, wherein each of said partitions is formed on its surface engaging one of said filtering packages with a plurality of ribs defining said passages.

* * * * *